US 8,197,141 B2

(12) United States Patent
Yamamoto et al.

(10) Patent No.: US 8,197,141 B2
(45) Date of Patent: Jun. 12, 2012

(54) FLUID DYNAMIC BEARING DEVICE

(75) Inventors: Tetsuya Yamamoto, Kuwana (JP);
Tetsuya Kurimura, Kuwana (JP)

(73) Assignee: NTN Corporation, Osaka-shi (JP)

( * ) Notice: Subject to any disclaimer, the term of this patent is extended or adjusted under 35 U.S.C. 154(b) by 754 days.

(21) Appl. No.: 12/303,867

(22) PCT Filed: Mar. 1, 2007

(86) PCT No.: PCT/JP2007/053881
§ 371 (c)(1),
(2), (4) Date: Dec. 8, 2008

(87) PCT Pub. No.: WO2007/141940
PCT Pub. Date: Dec. 13, 2007

(65) Prior Publication Data
US 2010/0239196 A1    Sep. 23, 2010

(30) Foreign Application Priority Data
Jun. 8, 2006 (JP) .............................. 2006-160022

(51) Int. Cl.
*F16C 32/06* (2006.01)
(52) U.S. Cl. ...................................... 384/107
(58) Field of Classification Search .................. 384/100, 384/107, 114
See application file for complete search history.

(56) References Cited

U.S. PATENT DOCUMENTS

| 6,832,853 B2 * | 12/2004 | Fujinaka | 384/100 |
| 7,776,802 B2 * | 8/2010 | Hirata et al. | 384/107 |
| 2003/0231813 A1 * | 12/2003 | Gomyo et al. | 384/107 |
| 2004/0013329 A1 * | 1/2004 | Yamashita et al. | 384/100 |
| 2007/0036475 A1 * | 2/2007 | Shishido et al. | 384/100 |

FOREIGN PATENT DOCUMENTS

| JP | 2000-283164 A | 10/2000 |
| JP | 2004-108549 A | 4/2004 |
| JP | 2005-337490 A | 12/2005 |
| JP | 2006-97735 A | 4/2006 |
| JP | 2006-105332 A | 4/2006 |

OTHER PUBLICATIONS

International Search Report of PCT/JP2007/053881, Mailing Date of Jun. 5, 2007.
Notification of Transmittal of Translation of the International Preliminary Report on Patentability (Form PCT/IB/338) of International Application No. PCT/JP2007/053881 mailed Jan. 22, 2009 with Forms PCT/IB/373 and PCT/ISA/237.
Japanese Office Action dated Aug. 5, 2011, issued in corresponding Japanese Patent Application No. 2007-317397.

* cited by examiner

*Primary Examiner* — Thomas R Hannon
(74) *Attorney, Agent, or Firm* — Westerman, Hattori, Daniels & Adrian, LLP

(57) ABSTRACT

A lid member (10) is formed in a cup-like shape while having a plate portion (10a) and a cylindrical fixed portion (10b) axially protruding from an outer peripheral end of the plate portion (10a). An outer peripheral surface (10b1) of the fixed portion (10b), which serves as a fixation surface (B), is fixed to an inner peripheral surface (7a) of a housing (7) as an outer member (A). An axial dimension of the fixation surface (B) is larger than a thickness of the plate portion (10a), and hence it is possible to thinly-form the plate portion (10a) and to increase a fixing force between the lid member (10) and the housing (7). As a result, an axial dimension of a fluid dynamic bearing device can be reduced and durability thereof can be simultaneously increased.

6 Claims, 6 Drawing Sheets

FLUID DYNAMIC BEARING DEVICE

TECHNICAL FIELD

The present invention relates to a fluid dynamic bearing device for rotatably supporting a shaft member by means of a lubricant film formed in a bearing gap.

BACKGROUND ART

By virtue of its high rotational precision and silence, a fluid dynamic bearing device can be suitably used in a small motor such as a spindle motor for an information apparatus such as a magnetic disk drive like an HDD, an optical disk drive for a CD-ROM, CD-R/RW, DVD-ROM/RAM or the like, or a magneto-optical disk drive for an MD, MO or the like, as a polygon scanner motor of a laser beam printer (LBP), as a motor for a projector color wheel, or as a fan motor for cooling an electrical apparatus or the like.

For example, the fluid dynamic bearing device (dynamic pressure bearing device) disclosed in Patent Document 1 includes the housing opened at both ends, the bearing sleeve arranged along the inner periphery of the housing, the shaft member inserted along the inner periphery of the bearing sleeve, and the lid member for closing the opening portion at the one end of the housing. The lid member is formed in a substantially disk shape, and the outer peripheral surface thereof is fixed to the inner peripheral surface of the housing.
Patent Document 1: JP 2005-337490 A

DISCLOSURE OF THE INVENTION

Problem to be Solved by the Invention

In recent years, for thinly-forming information apparatuses and the like, there is a demand for reduction in axial dimensions of the disk drive and the like for an HDD used in those apparatuses, and by extension, of the bearing device incorporated in those devices. In order to meet the demand, the lid member is thinly-formed for closing the opening portion at the one end of the housing.

However, when the lid member is thinly-formed in the conventional apparatus, the fixation area between the lid member and the housing is reduced because the outer peripheral surface of the disk-like lid member is fixed to the inner peripheral surface of the housing. As a result, the fixing force therebetween is reduced. For example, in the disk drive whose weight is increased owing to multiple disks mounted therein, a large impact load is applied upon falling or the like. Thus, when the fixing force between the lid member and the housing is insufficient, the lid member is displaced with respect to the housing owing to the impact load and the like, which may lead to the risk of failures such as leakage of the lubricant oil in the bearing and deterioration in accuracy of the thrust bearing gaps.

It is an object of the present invention to thinly-form the lid member and to increase a fixing force between the lid member and the housing, to thereby downsize the fluid dynamic bearing device and to increase durability thereof.

Means for Solving the Problem

In order to achieve the above-mentioned object, the present invention provides a fluid dynamic bearing device, including:
an outer member opened at its both ends;
a shaft member inserted inside the outer member;
a lid member for closing an opening portion at one of the both ends of the outer member; and
a radial bearing gap facing with an outer peripheral surface of the shaft member and having one end communicating with a space closed by means of the lid member, the radial bearing gap including an oil film with which the shaft member is rotatably supported,
characterized in that the lid member includes a plate portion and a fixation surface to be fixed to an inner peripheral surface or an outer peripheral surface of the outer member, the fixation surface having an axial dimension larger than a thickness of the plate portion.

As described above, in the present invention, the lid member is provided with the plate portion and the fixation surface fixed to the inner peripheral surface or the outer peripheral surface of the outer member. This fixation surface has the axial dimension larger than the thickness of the plate portion, and hence it is possible to thinly-form the plate portion and to increase the fixing force between the fixation surface and the inner peripheral surface of the outer member. Accordingly, the fluid dynamic bearing device can be downsized and durability thereof can be simultaneously increased.

The fixation surface of the lid member further includes a fixed portion extending in an axial direction from, for example, an outer diameter end of the plate portion, and may be formed on an outer peripheral surface or an inner peripheral surface of the fixed portion.

In this fluid dynamic bearing device, an open space is formed in some cases between the lid member and the outer member, which is opened toward an inner periphery or an outer periphery of the outer member. The open space may be defined, for example, between a chamfer of an end surface of the lid member and a chamfer of an end surface of the outer member. Alternatively, in the bearing structure in which the width of the thrust bearing gap is controlled through adjustment of the axial position of the lid member with respect to the outer member, an axial open space is also formed in some cases between the end surface of the lid member and the end surface of the outer member in accordance with some degree of adjustment of the gap widths.

Normally, in the fluid dynamic bearing device of this type, the space inside the outer member is entirely filled with a fluid lubricant. Meanwhile, in order to prevent leakage of the lubricant toward the outside of the outer member, which is caused by thermal expansion of the lubricant sealed inside the fluid dynamic bearing device, it is necessary to provide a fluid dynamic bearing device with also a sealing device having a buffer function with which the thermal expansion of the lubricant oil is absorbed. In the above-mentioned fluid dynamic bearing device, in a case where the fixation surface of the lid member is fixed to the inner peripheral surface of the outer member so that the open space is opened toward the inner periphery of the outer member, the open space is also filled with the lubricant when the space inside the outer member is filled with the fluid lubricant. Accordingly, the total amount of the lubricant in the bearing device is increased, and hence it is necessary to enlarge the sealing device for securing the buffer function. When the open space is filled with the adhesive, the total amount of the lubricant in the bearing device can be reduced by that much. As a result, it is possible to reduce the capacity of the buffer function, that is, to downsize the sealing device, thereby further downsizing the bearing device.

Meanwhile, in the above-mentioned fluid dynamic bearing device, when the fixation surface of the lid member is fixed to the outer peripheral surface of the outer member so that an open space is opened toward the outer periphery of the outer member, the open space is allowed to serve as an adhesive pool when the other members are fixed by bonding to the outer peripheral surface of the outer member. As a result, it is possible to increase the fixing force between the outer member and the other members.

In this fluid dynamic bearing device, the shaft member may include a flange portion in which one end surface of the flange portion can be opposed to the plate portion of the lid member, and in which a thrust bearing gap can be formed while being faced with another end surface of the flange portion. In this case, of the lid member, with positioning of an end surface of the fixed portion having the fixation surface beyond the thrust bearing gap, it is possible to secure the sufficient area for the fixation surface, and to secure the excellent fixing force between the fixed portion and the outer member. In particular, even when the open space opened toward the inner periphery of the outer member is filled with the adhesive as described above, the open space and the thrust bearing gaps are separated from each other, and hence the situation can be reliably prevented in which a surplus adhesive overflows from the open space upon supply of the adhesive and flows into the thrust bearing gaps so as to cause the adverse effect on the bearing performance.

Effects of the Invention

As described above, according to the present invention, the plate portion is thinly-formed and the fixing force between the fixation surface and the inner peripheral surface of the outer member is increased, whereby the fluid dynamic bearing device can be downsized and durability thereof can be simultaneously increased.

BEST MODES FOR CARRYING OUT THE INVENTION

In the following, embodiments of the present invention are described.

FIG. 1 illustrates a construction example of a spindle motor for an information apparatus, in which a dynamic pressure bearing device 1 according to a first embodiment of the present invention is incorporated. This spindle motor is used for the disk drive such as an HDD, and includes the dynamic pressure bearing device 1 for rotatably supporting a shaft member 2 in a non-contact manner, a disk hub 3 mounted to the shaft member 2, a bracket 6 mounted to the outer periphery of the dynamic pressure bearing device 1, a motor stator 4 and a motor rotor 5 opposed to each other through an intermediation of, for example, a radial gap. The motor stator 4 is mounted to a mount portion provided to the outer peripheral surface of the bracket 6, and the motor rotor 5 is mounted to the inner periphery of the disk hub 3. One or multiple disks D such as magnetic disks are held on the disk hub 3. When the motor stator is energized, the motor rotor 5 is rotated by means of an electromagnetic force between the motor stator 4 and the motor rotor 5, whereby the disk hub 3 and the shaft member 2 are integrally rotated.

FIG. 2 illustrates the dynamic pressure bearing device 1. This dynamic pressure bearing device 1 includes a housing 7 as an outer member A opened at both axial ends, a lid member 10 for closing an opening portion at one end of the housing 7, a bearing sleeve 8 fixed to an inner peripheral surface 7a of the housing 7, and the shaft member 2 inserted along the inner periphery of the housing 7. Note that, for the sake of convenience in description, description is made on the assumption that the side on which the housing 7 is closed by means of the lid member 10 is a lower side, and the side opposite thereto is an upper side.

The shaft member 2 has a shaft portion 2a and a flange portion 2b provided at the lower end of the shaft portion 2a, and is integrally or separately made of a metal material such as SUS steel. The portions of the shaft member 2 may be made of a material of the same type, or may be made of other materials. For example, the shaft portion 2a may be made of a metal material, and a part or the entire of the flange portion 2b may be made of a resin material. In this case, it is possible to manufacture the shaft member 2 by resin injection molding in which the shaft portion 2a is used as an insert component.

The housing 7 is formed in a substantially cylindrical shape, and is provided integrally with a sealing portion 9 for sealing the upper end opening portion of the housing 7. The housing 7 has a small diameter inner peripheral surface 7a and a large diameter inner peripheral surface 7b provided at the lower end opening portion, and a step portion 7c formed between the small diameter inner peripheral surface 7a and the large diameter inner peripheral surface 7b. The bearing sleeve 8 is fixed to the small diameter inner peripheral surface 7a, and the lid member 10 is fixed to the large diameter inner peripheral surface 7b. Note that, the sealing portion 9 may be formed separately from the housing 7.

The housing 7 and the sealing portion 9 are formed by injection molding of a crystalline resin such as liquid crystal polymer (LCP), polyphenylene sulfide (PPS), and polyetherether ketone (PEEK), or of a resin composition with a base resin formed of an amorphous resin such as polyphenyl sulfone (PPSU), polyether sulfone (PES), and polyether imide (PEI). There are no particular limitations regarding the type of filler used with the above-mentioned resins. Examples of the filler that can be used include fibrous fillers such as glass fiber, whisker-like fillers such as potassium titanate, scale-like fillers such as mica, and fibrous or powdered conductive fillers such as carbon fiber, carbon black, graphite, carbon nanomaterial, and metal powder. Those fillers may be used singly or in a combination of two or more kinds.

An inner peripheral surface 9a of the sealing portion 9 is opposed to a tapered surface 2a2 provided to the outer periphery of the shaft portion 2a through an intermediation of a predetermined seal space S so as to form the capillary seal for retaining the lubricant oil with a capillary force. Note that, as illustrated in the figure, when the tapered surface 2a2 of the shaft portion 2a is gradually reduced upward in diameter, the seal space S may be allowed to serve as a centrifugal seal when the shaft member 2 is rotated. Within the operating temperature limit of the bearing device, the volume of the seal space S is set to be larger so as to allow for the thermal expansion rate of the lubricant oil retained in the bearing device. With this configuration, the lubricant oil does not leak through the seal space S within the operating temperature limit of the bearing device, and the oil surface is constantly retained within the seal space S (buffer function).

As illustrated in FIG. 2, a lower end surface 9b of the sealing portion 9 is formed in an inclined shape or a curved shape such that the outer diameter side region thereof is separated from an upper end surface 8b of the bearing sleeve 8. As a result, the lower end surface 9b of the sealing portion 9 is partially brought into contact with an inner diameter side region 8b2 of an upper end surface 8b of the bearing sleeve 8, and a gap is formed between the lower end surface 9b and an outer diameter side region 8b3 of the upper end surface 8b.

The bearing sleeve 8 is formed in a cylindrical shape by means of a porous material made of, for example, a sintered metal, in particular, a porous material made of a sintered metal including copper as a main component, and is fixed to a predetermined position of the small diameter inner peripheral surface 7a of the housing by press-fitting, bonding, press-fitting with an adhesive therebetween, or the like.

As illustrated in FIG. 3(a), an inner peripheral surface 8a of the bearing sleeve 8 is provided with herringbone dynamic pressure grooves 8a1 and 8a2 which are separately formed in the axial direction. The upper dynamic pressure groove 8a1 is formed asymmetrically in the axial direction with respect to an axial center m (axial center of the region between the upper and lower inclined grooves), and an axial dimension X1 in the upper region with respect to the axial center m is larger than an axial dimension X2 in the lower region. When the shaft member 2 is rotated, between the regions where the dynamic pressure grooves 8a1 and 8a2 are formed and an outer peripheral surface 2a1 of the shaft member 2, a first radial bearing gap R1 and a second radial bearing gap R2 are formed. Further, in an outer peripheral surface 8d of the bearing sleeve 8, one or multiple axial grooves 8d1 are formed over the entire axial length. In this example, three axial grooves 8d1 are equiangularly formed. Note that, the dynamic pressure grooves 8a1 and 8a2 are not necessarily spaced apart from each other in the axial direction, but may be continuously provided in the axial direction, for example. Alternatively, only one of the dynamic pressure grooves 8a1 and 8a2 may be formed.

In the entire or the partially annular region of a lower end surface 8c of the bearing sleeve 8, a spiral dynamic pressure groove 8c1 is formed as illustrated in FIG. 3(b), for example. When the shaft member 2 is rotated, between the region where the dynamic pressure groove 8c1 is formed and an upper end surface 2b1 of the flange portion 2b, a first thrust bearing gap T1 is formed.

As illustrated in FIG. 3(c), the upper end surface 8b of the bearing sleeve 8 is partitioned into the inner diameter side region 8b2 and the outer diameter side region 8b3 by a circumferential groove 8b1 provided at a substantially central portion in the radial direction, and one or multiple radial grooves 8b21 are formed in the inner diameter side region 8b2. In this example, three radial grooves 8b21 are equiangularly formed.

The lid member 10 has the plate portion 10a of a substantially disk shape and the cylindrical fixed portion 10b axially protruding from the outer peripheral end of the plate portion 10a, and is integrally formed, for example, by press working of a metal material such as a brass. In an upper end surface 10a1 of the plate portion 10a, a spiral dynamic pressure groove 10a11 is formed as illustrated in FIG. 4, for example. When the shaft member 2 is rotated, between the region where the dynamic pressure groove 10a11 is formed and a lower end surface 2b2 of the flange portion 2b, a second thrust bearing gap T2 is formed.

Of the lid member 10, an outer peripheral surface 10b1 of the fixed portion 10b serves as a fixation surface B which is fixed to the large diameter inner peripheral surface 7b of the housing 7. An inner peripheral surface 10b2 of the fixed portion 10b is faced with the space in the bearing, and opposed to the outer peripheral surface of the flange portion 2b through the intermediation of the radial gap.

As illustrated in FIG. 2, the fixation surface B of the lid member 10 (outer peripheral surface 10b1 of fixed portion 10b) has an axial dimension larger than a thickness of the plate portion 10a. As a result, it is possible to thinly-form the plate portion 10a, and to increase the fixing force between the lid member 10 and the housing 7, whereby the durability of the dynamic pressure bearing device 1 can be increased and the axial dimension thereof can be reduced. Further, without increasing the axial dimension of the dynamic pressure bearing device 1, the axial dimension of the bearing sleeve 8 can be increased correspondingly to a thinly-forming amount of the lid member 10. Thus, with the axial gap increased between the radial bearing gaps R1 and R2, the bearing strength in the radial direction can be increased.

Further, with an end surface 10b3 of the fixed portion 10b of the lid member 10 positioned beyond and above the first thrust bearing gap T1, it is possible to sufficiently secure the area of the fixation surface B, to thereby fix the lid member 10 and the housing 7 to each other.

As described above, when the end surface 10b3 of the fixed portion 10b is disposed beyond the first thrust bearing gap T1, the inner peripheral surface 10b2 of the fixed portion 10b is engaged with an outer peripheral surface 8d of the bearing sleeve 8 (refer to FIG. 2). In general, a resin material has an adhesive fixing force lower than that of a metal material, and there is a risk in that sufficient fixing force may not be obtained when the lid member 10 is fixed by bonding to only the housing 7 made of a resin. In this case, simultaneously with the adhesive fixation to the housing 7, when the inner peripheral surface 10b2 of the fixed portion 10b is fixed by bonding to the outer peripheral surface 8d of the bearing sleeve 8, the fixing force of the lid member 10 is increased.

When the lid member 10 is fixed to the housing 7, in addition to the fixation by bonding as described above, the fixation may be performed only by press-fitting or by the combination of press-fitting and bonding. In the case of performing the fixation with a press-fitting force, when the entire of the fixation surface B is press-fitted, the cylindrical fixed portion 10b of the lid member 10, which has a small strength, is deformed owing to the press-fitting force. The deformation extends to the plate portion 10a, which leads to a risk of deteriorating the accuracy of the gap widths of the thrust bearing gaps. Therefore, in the fixation surface B, it is desirable that press-fitting be performed within the region including an outer diameter side region P of the plate portion 10a at least, and in the other regions, only bonding be performed such that the lid member 10 is fixed to the large diameter inner peripheral surface 7b of the housing 7. Bonding in this case is a so-called gap bonding by which clearance fit is provided between the fixation surface B and the large diameter inner peripheral surface 7b of the housing 7 such that adhesive fixation is achieved. When the entire of the fixation surface B is subjected to gap bonding, it is necessary to perform positioning of the lid member 10 with respect to the housing 7 with use of a jig until the adhesive is cured. However, when press-fitting is performed at least in the region P, the positioning with use of the jig is unnecessary.

Further, when the lateral sectional shape of the large diameter inner peripheral surface 7b of the housing 7 is polygonal (icosagonal, for example) or irregular such that the outer peripheral surface 10b1 of the lid member 10 is partially press-fitted to the large diameter inner peripheral surface 7b of the housing 7 in the circumferential direction, it is possible to further suppress the deformation of the lid member 10 owing to the press-fitting force.

When the shaft member 2 is rotated, the regions where the dynamic pressure grooves 8a1 and 8a2 of the inner peripheral surface 8a of the bearing sleeve 8 are formed are opposed to an outer peripheral surface 2a1 of the shaft portion 2a through an intermediation of the radial bearing gaps R1 and R2, respectively. Further, the region where the dynamic pressure groove 8c1 of the lower end surface 8c of the bearing sleeve 8 is formed is opposed to the upper end surface 2b1 of the flange portion 2b through an intermediation of the first thrust bearing gap T1, and the region where the dynamic pressure groove 10a11 of the end surface 10a1 of the lid member 10 is formed is opposed to the lower end surface 2b2 of the flange portion 2b through an intermediation of the second thrust bearing gap T2. Then, in accordance with the rotation of the shaft member 2, the dynamic pressure grooves 8a1 and 8a2 generate the dynamic pressure effect in the lubricant oil in the radial bearing gaps R1 and R2, whereby the shaft portion 2a of the shaft member 2 is rotatably supported in the radial direction in a non-contact manner. Simultaneously, the dynamic pressure grooves 8a1 and 10a11 generate the dynamic pressure effect in the lubricant oil in the thrust bearing gaps T1 and T2, whereby the flange portion 2b of the shaft member 2 is rotatably supported in both the thrust directions in a non-contact manner. In this case, one end of each of the radial bearing gaps R1 and R2 communicates with the space sealed by means of the lid member 10, that is, the first thrust bearing gap T1, the space between the outer peripheral surface of the flange portion 2b and the inner peripheral surface 10b2 of the fixed portion 10b of the lid member 10, and the second thrust bearing gap T2.

As described above, the dynamic pressure groove 8a1 of the inner peripheral surface 8a of the bearing sleeve 8 is formed asymmetrically in the axial direction with respect to the axial center m, and the axial dimension X1 in the upper region with respect to the axial center m is larger than the axial dimension X2 in the lower region (refer to FIG. 3(a)). Therefore, when the shaft member 2 is rotated, a drawing-in force to the lubricant oil generated by the dynamic pressure groove 8a1 (pumping force) is relatively large in the upper region as compared with that in the lower region. In this context, due to differential pressure caused by the drawing-in force, the lubricant oil filled in the first radial bearing gap R1 flows downwards, and circulates through the path constituted by the first thrust bearing gap T1, the axial groove 8d1, the gap between the lower end surface 9b of the sealing portion 9 and the outer diameter side region 8b3 of the upper end surface 8b of the bearing sleeve 8, the circumferential groove 8b1, and the radial groove 8b21 in the stated order so as to be drawn into the first radial bearing gap R1 again. In this way, the lubricant oil flows and circulates through the inner space of the housing 7, whereby a phenomenon can be prevented in which the pressure of the lubricant oil filled in the inner space becomes locally negative. As a result, it is possible to solve the problems such as generation of bubbles in accordance with generation of negative pressure and leakage of lubricant oil and occurrence of vibration due to generation of bubbles. Further, even when bubbles are mixed into the lubricant oil for some reason or other, such bubbles are discharged into the atmosphere via the oil surface (gas/liquid interface) of the lubricant oil in the seal space S when the bubbles circulate with the lubricant oil. As a result, the adverse effect of the bubbles is prevented even more effectively.

The assembly of the fluid dynamic bearing device structured as described above is performed as follows: the bearing sleeve 8 is inserted along the inner periphery of the housing 7 so as to be fixed to the housing 7 by bonding or the like, the shaft member 2 is inserted along the inner periphery of the bearing sleeve 8, and then the lid member 10 is fixed to the opening portion of the housing 7. In this case, through adjustment of the axial position of the lid member 10 with respect to the housing 7, the gap widths of the thrust bearing gaps T1 and T2 are controlled to be specified values. After that, the lubricant oil is supplied inside the bearing device from the seal space S, and the whole inner space of the housing including the inner air-hole of the bearing sleeve 8 is filled with the lubricant oil. In this manner, the bearing device illustrated in FIG. 2 is completed.

In this assembling process, in order to secure the adjustment allowance of the thrust bearing gaps T1 and T2, an axial gap is left in some cases between the end surface 10b3 of the fixed portion 10b of the lid member 10 and a step portion 7c of the housing 7. The axial gap forms an open space G opened toward the inner periphery of the housing 7 (refer to an enlarged part of FIG. 2). Without any particular countermeasure, the open space G is also filled with the lubricant oil after the supply of the lubricant oil.

In contrast, as enlargedly illustrated in FIG. 2, when the open space G is filled with an adhesive, it is possible to prevent the lubricant oil from flowing into the open space G, to thereby reduce the total oil amount in the bearing device correspondingly to the amount of the volume of the open space G. When the total oil amount is reduced, the thermal expansion rate of the lubricant oil is reduced correspondingly thereto. As a result, the volume of the seal space S having a buffer function can be reduced, whereby the axial dimension of the seal space S is reduced such that the axial dimension of the bearing device is further reduced. In order to fill the open space G with the adhesive as described above, a somewhat larger amount of adhesive is applied to the end surface 10b3 of the fixed portion 10b of the lid member 10 in advance so as to be pressed into the opening portion of the housing 7.

When the open space G is filled with the adhesive as described above, there is a risk in that a surplus adhesive overflows from the open space G. However, even when overflowing, the adhesive can be reliably prevented from flowing into the first thrust bearing gap T1 as long as the open space G is located beyond the first thrust bearing gap T1 as in the example illustrated in the figure. As a result, it is possible to prevent the deterioration of the bearing performance in the thrust bearing gap T1.

Note that, in the assembly of the bearing device, by means of the end surface 10b3 of the fixed portion 10b of the lid member 10 and the step portion 7c of the housing 7 brought into contact with each other, the gap widths of the thrust bearing gaps T1 and T2 may be set. In this case, the open space G is defined between an inner peripheral chamfer of the end surface 10b3 of the fixed portion 10b and an inner peripheral chamfer of the step portion 7c of the housing 7. With the open space G filled with the adhesive, the same effect as described above can be obtained.

The embodiment of the present invention is not limited thereto. Note that, in the following description, the similar parts as those in the above-mentioned embodiment are denoted by the same reference symbols, and the description thereof is omitted.

FIG. 5 illustrates a dynamic pressure bearing device 21 according to a second embodiment of the present invention. In this dynamic pressure bearing device 21, the inner peripheral surface 7a of the housing 7 is formed into a cylindrical shape. The bearing sleeve 8 has a large diameter outer peripheral surface 8d and a small diameter outer peripheral surface 8e as an outer peripheral surface. The large diameter outer peripheral surface 8d is fixed to the inner peripheral surface 7a of the housing 7, and the fixed portion 10b of the lid member 10 is fit-engaged between the small diameter outer peripheral surface 8e and the inner peripheral surface 7a of the housing 7.

FIG. 6 illustrates a dynamic pressure bearing device 31 according to a third embodiment of the present invention. In this dynamic pressure bearing device 31, a large diameter outer peripheral surface 7d and a small diameter outer peripheral surface 7e are formed as the outer peripheral surface of the housing 7, and the inner peripheral surface 10b2 of the fixed portion 10b of the lid member 10 is fixed to the small diameter outer peripheral surface 7e. In this embodiment, the fixation between the lid member 10 and the housing 7 is performed by the combination of press-fitting and gap bonding. In this case, of the inner peripheral surface 10b2 of the fixed portion 10b, which serves as the fixation surface B, it is preferable that a press-fit portion P be provided on the side of the plate portion 10a as closely thereto as possible. With this structure, it is possible to prevent deformation of the plate portion 10a caused by press-fitting, and to block the lubricant oil in the portion fixed by bonding and inside the bearing at the press-fit portion P. Therefore, the situation can be reliably prevented in which the adhesive flows into the thrust bearing gaps T1 and T2 so as to cause the adverse effect on the bearing performance. Further, it is unnecessary to impart oil resistance to the adhesive of this case, and hence the degree of freedom in selecting adhesive is increased.

Further, when the bracket 6 is fixed by bonding to the outer peripheral surface of the dynamic pressure bearing device 31, simultaneously with the adhesive fixation thereof to the housing 7 made of a resin, the bracket 6 is fixed by bonding to the metal lid member between which the fixing force of the adhesive is relatively large. As a result, the adhesive strength is increased. Further, by means of the open space G, which is formed between the housing 7 and the lid member 10 and is opened toward the outer periphery of the housing 7, serving as an adhesive pool, it is possible to further increase the adhesive strength between the dynamic pressure bearing device 1 and the bracket 6.

Further, in this embodiment, as illustrated in FIG. 6(b), an lower end portion 7g of the housing 7 and the upper end surface 10a1 of the plate portion 10a of the lid member 10 are out of contact from each other. In this context, by means of those members brought into contact with each other, it is also possible to set the gap widths of the thrust bearing gaps T1 and T2.

FIG. 7 illustrates a dynamic pressure bearing device 41 according to a fourth embodiment of the present invention. In this dynamic pressure bearing device 41, the housing 7 and the bearing sleeve 8 are integrally formed as a bearing member 11 with use of a resin material, the bearing member 11 serving as the outer member A. The sealing portion 9 is formed separately from the housing 7 so as to be fixed to the large diameter inner peripheral surface 7a provided at the upper end opening portion of the bearing member 11. The lower end surface 9b thereof is brought into contact with the upper end surface 8b of the bearing sleeve 8. The inner peripheral surface 9a of the sealing portion 9 has a tapered surface gradually increased in diameter upward, and the seal space S is formed between the inner peripheral surface 9a and the cylindrical outer peripheral surface 2a1 of the shaft portion 2a. The lid member 10 is fixed to a small diameter outer peripheral surface 7e provided at the lower end of the bearing member 11. The outer peripheral surface 2a1 of the shaft portion 2a is provided with herringbone dynamic pressure grooves 2a11 and 2a12 which are formed at two portions separated from each other in the axial direction. When the shaft member 2 is rotated, the region where the dynamic pressure grooves are formed generate the dynamic pressure effect in the lubricant oil in the radial bearing gaps R1 and R2.

While the housing 7 is made of a resin in the above-mentioned embodiments, the material thereof is not limited thereto, and may be made of a metal material, for example. Further, in the above-mentioned description, the lid member 10 is made of a metal material, and may be made of a resin material. Still further, in the above-mentioned description, the bearing sleeve 8 is made of a sintered metal, and may be made of other metal materials or resin materials.

Further, in the above-mentioned embodiments, the herringbone dynamic pressure grooves 8a1 and 8a2 are formed as dynamic pressure generating portions (radial dynamic pressure generating portions) for generating the dynamic pressure effect in the lubricant oil in the radial bearing gaps R1 and R2, and the spiral dynamic pressure grooves 8c1 and 10a11 are formed as dynamic pressure generating portions (thrust dynamic pressure generating portions) for generating the dynamic pressure effect in the lubricant oil in the thrust bearing gaps T1 and T2. However, this should not be construed restrictively. For example, as a radial dynamic pressure generating portion, it is possible to form a spiral dynamic pressure groove, a step bearing, a multi-arc bearing, or the like. Further, as a thrust dynamic pressure generating portion, it is possible to form a herringbone dynamic pressure groove, a step bearing, a corrugated bearing (step bearing having a corrugated shape), or the like.

Further, the radial dynamic pressure generating portion may be provided to any of the inner peripheral surface 8a of the bearing sleeve 8 and the outer peripheral surface 2a1 of the shaft portion 2a. Further, the dynamic pressure generating portion of the first thrust bearing gap T1 may be provided to any of the lower end surface 8c of the bearing sleeve 8 and the upper end surface 2b1 of the flange portion 2b, and the dynamic pressure generating portion of the second thrust bearing gap T2 may be provided to any of the end surface 10a1 of the lid member 10 and the lower end surface 2b2 of the flange portion 2b.

Further, while the shaft member 2 is provided with the flange portion 2b in the above-mentioned embodiments, a cylindrical shaft member without a flange portion may be used. For example, it is possible to provide a lower end surface to the shaft member 2, and to form the thrust bearing portion by means of the dynamic pressure effect of the lubricant oil of the thrust bearing gap formed between the lower end surface and the end surface 10a1 of the lid member 10. Alternatively, it is possible to use the shaft member 2 having a spherical protrusion at the lower end thereof, and to constitute a pivot bearing by means of the spherical protrusion and the end surface of the lid member. In this case, one end of each of the radial bearing gaps communicates with the space sealed by means of the lid member 10, that is, the thrust bearing gaps and the space formed between the spherical protrusion and the lid member 10.

Alternatively, it is possible to form any of the inner peripheral surface 8a of the bearing sleeve 8 and the outer peripheral surface of the shaft portion 2a into a complete circular shape, and to constitute the radial bearing portion as a so-called complete circular bearing.

Further, while the lubricant oil is used as the lubricant filled inside the bearing device in the above-mentioned embodiments, this should not be construed restrictively. For example, it is also possible to use lubricant grease, magnetic fluid or a gas such as air.

Further, the dynamic pressure bearing device of the present invention is not limited as described above to a spindle motor to be used in a disk drive such as an HDD. The dynamic pressure bearing device of the present invention is also suitably applicable to the supporting of the rotary shaft of a small motor for an information apparatus used under high speed rotating condition, such as a spindle motor for driving an optical disk or a magneto-optical disk, a polygon scanner motor in a laser beam printer, or to a fan motor for cooling an electrical apparatus.

Figure 1:
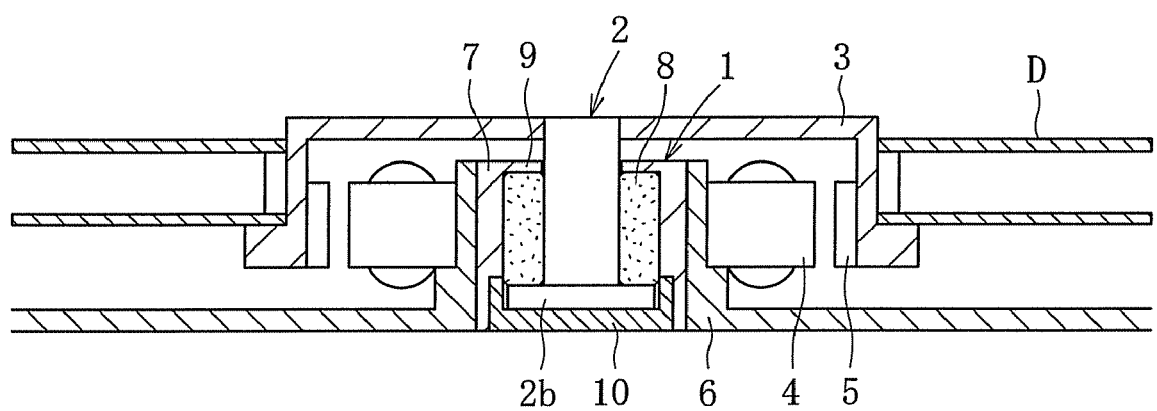
FIG. 1 is a sectional view of a spindle motor in which a dynamic pressure bearing device 1 is incorporated.
Figure 2:
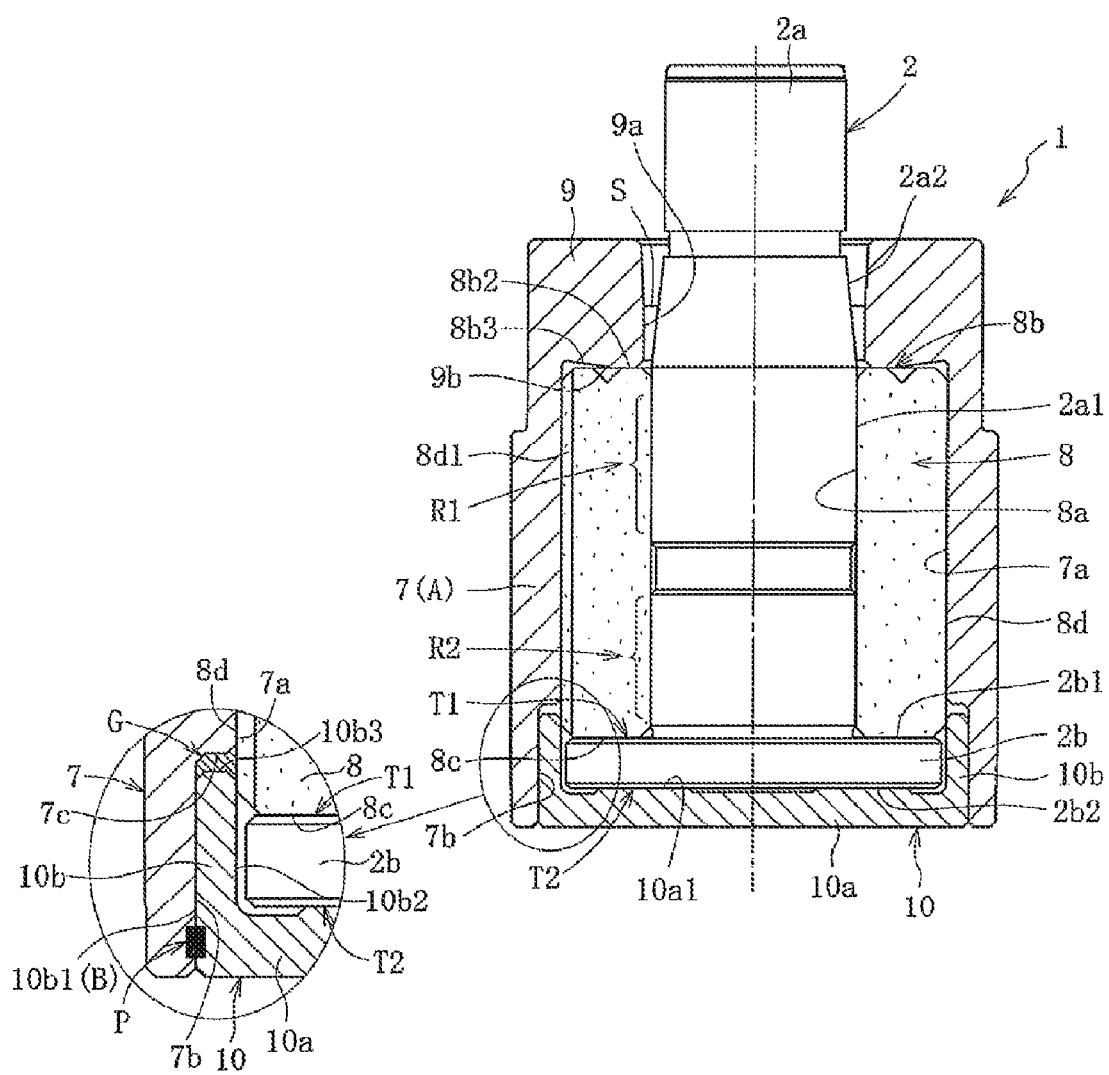
FIG. 2 is a sectional view of the dynamic pressure bearing device 1.
Figure 3A:
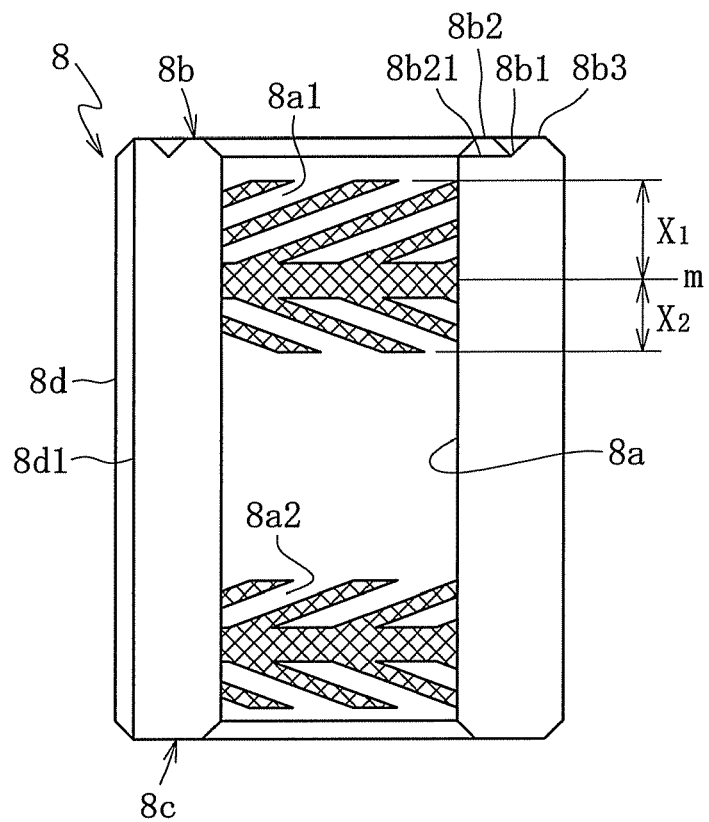
FIG. 3(a) is a sectional view (taken along the line a-a of FIG. 3(c))
Figure 3B:
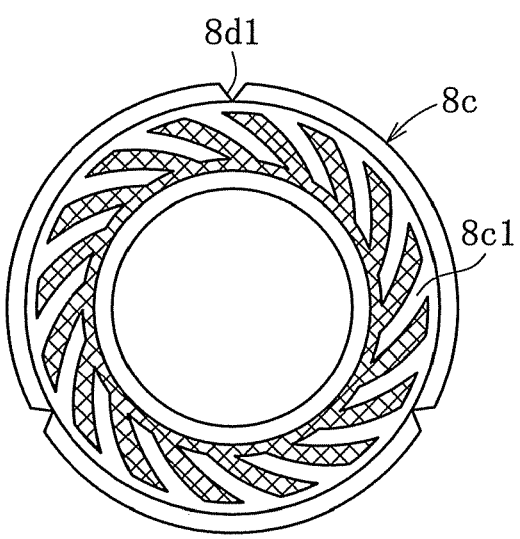
FIG. 3(b) is a bottom view.
Figure 3C:
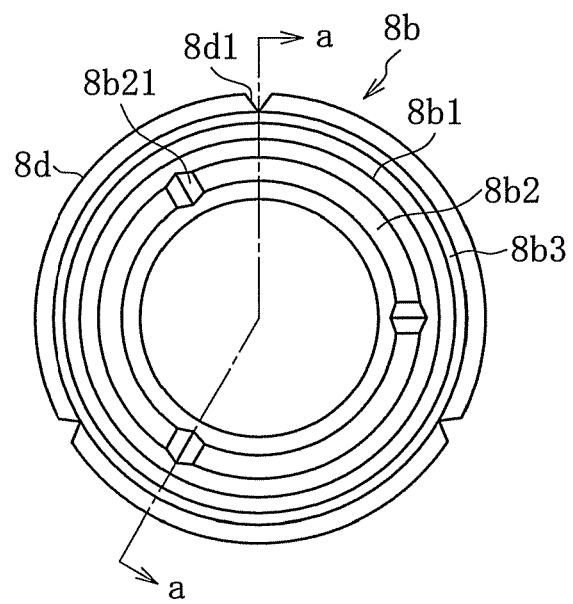
FIG. 3(c) is a top view of a bearing sleeve 8.
Figure 4:
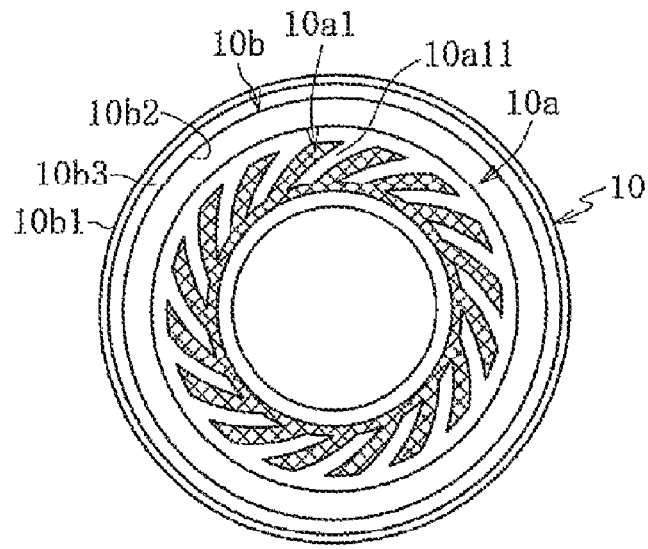
FIG. 4 is a top view of a lid member 10.
Figure 5:
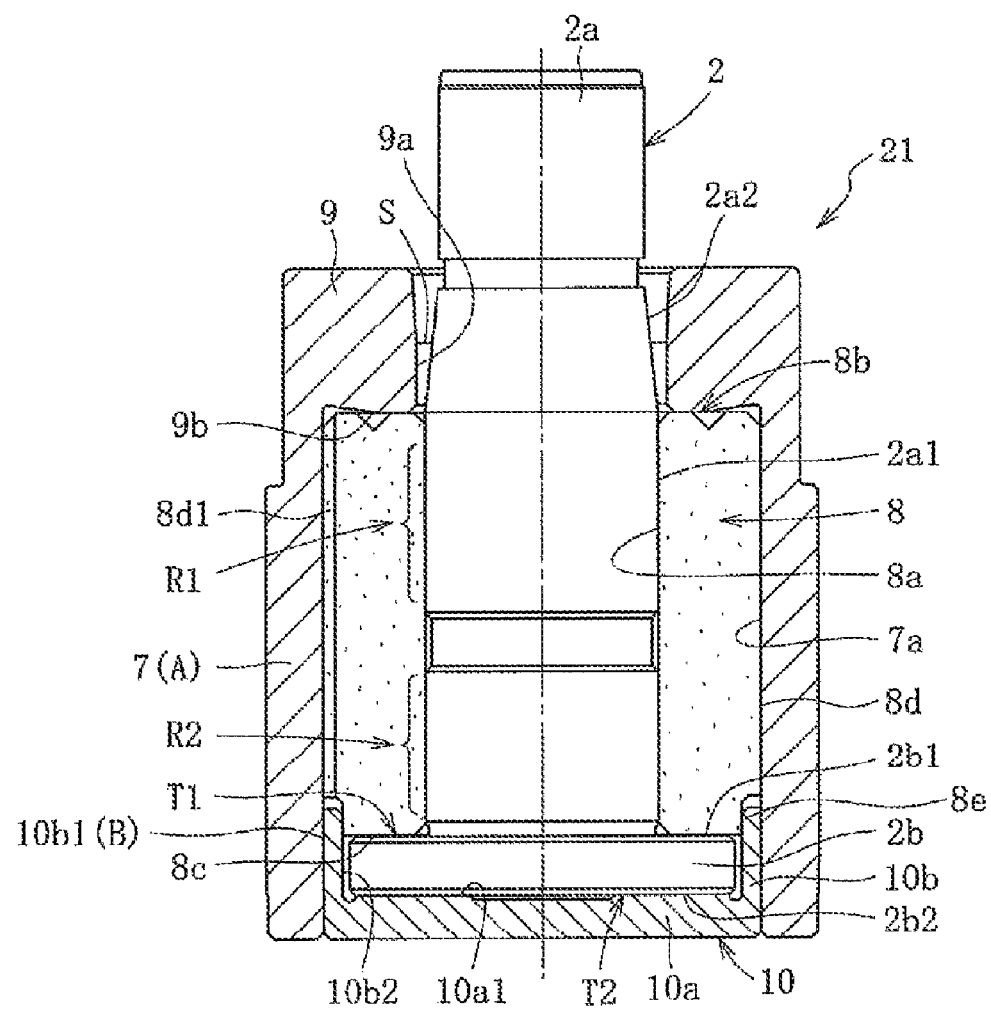
FIG. 5 is a sectional view of a dynamic pressure bearing device 21 according to a second embodiment of the present invention.
Figure 6A:
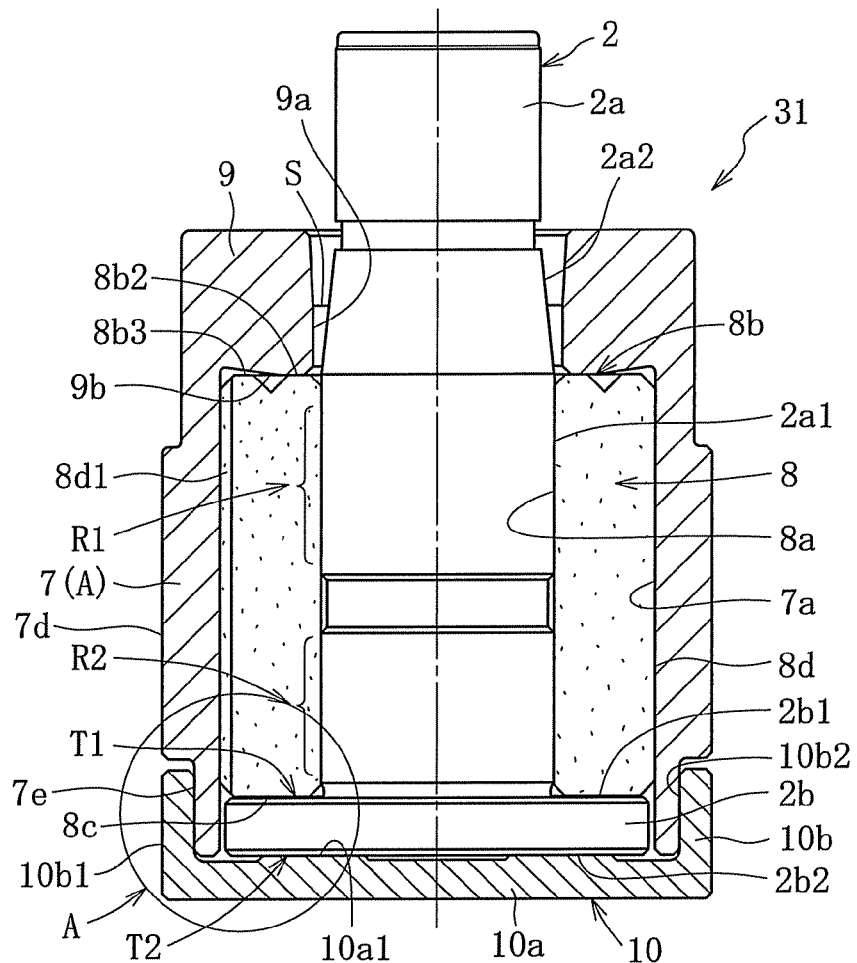
FIG. 6(a) is a sectional view of a dynamic pressure bearing device 31 according to a third embodiment of the present invention.
Figure 6B:
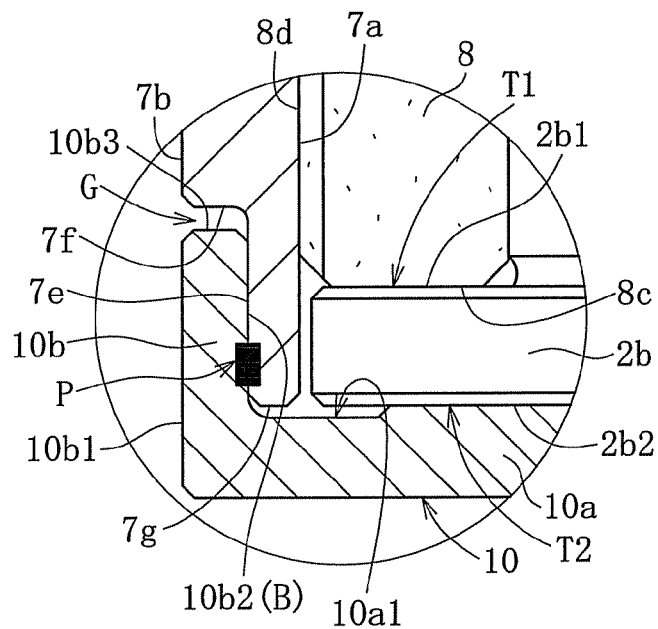
FIG. 6(b) is an enlarged sectional view of a part A of FIG. 6(a).
Figure 7:
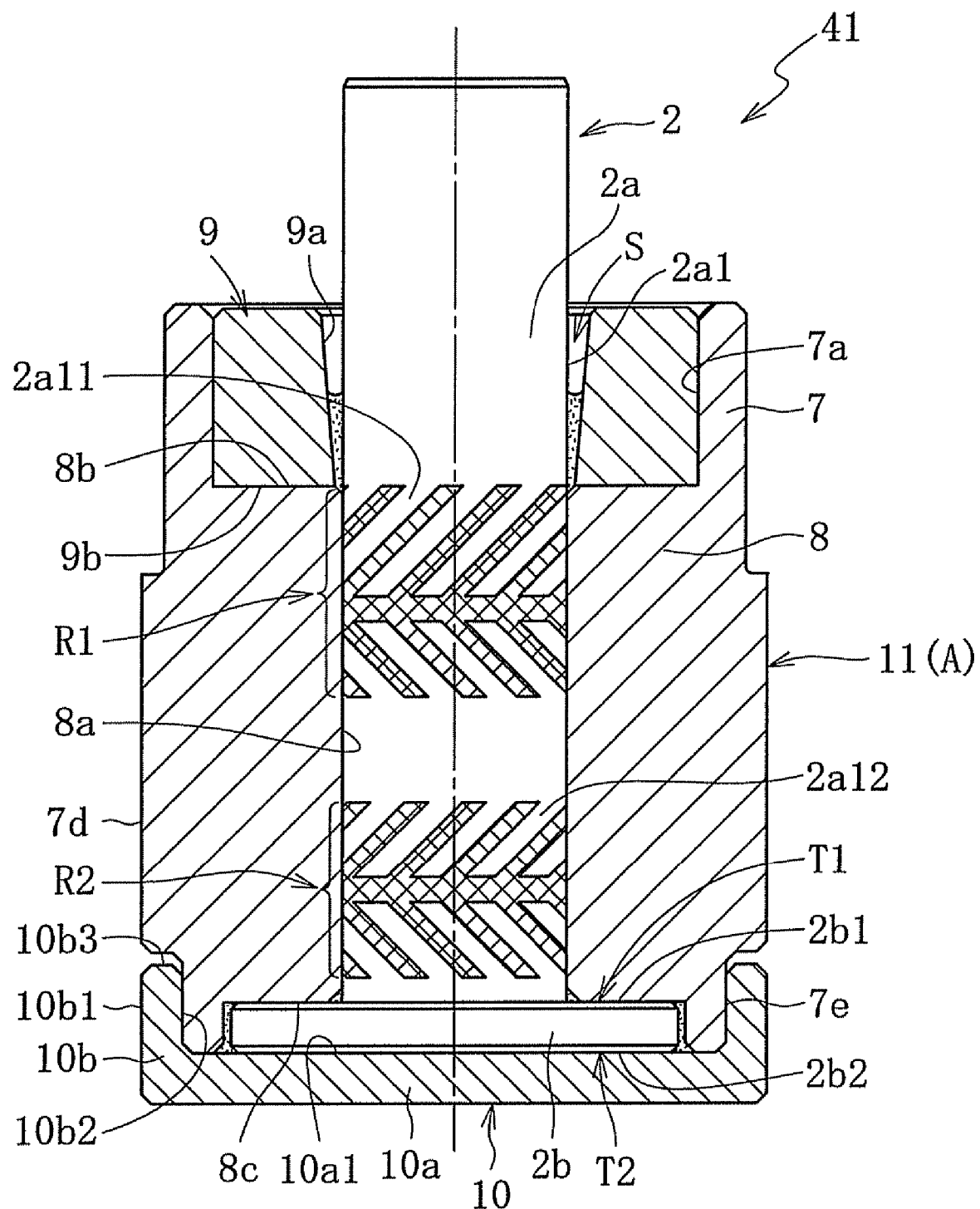
FIG. 7 is a sectional view of a dynamic pressure bearing device 41 according to a fourth embodiment of the present invention.

DESCRIPTION OF REFERENCE SYMBOLS 1 dynamic pressure bearing device (fluid dynamic bearing device)
2 shaft member
3 disk hub
7 housing
8 bearing sleeve
9 sealing portion
10 lid member
10a plate portion
10b fixed portion
A outer member
B fixation surface
G open space
P press-fit region
R1, R2 radial bearing gap
T1, T2 thrust bearing gap
S seal space

The invention claimed is:

1. A fluid dynamic bearing device, comprising:
an outer member opened at its both ends;
a shaft member inserted inside the outer member;
a lid member for closing an opening portion at one of the both ends of the outer member; and
a radial bearing gap facing with an outer peripheral surface of the shaft member and having one end communicating with a space closed by means of the lid member, the radial bearing gap including an oil film with which the shaft member is rotatably supported,
wherein the lid member comprises a plate portion and a fixation surface to be fixed to an inner peripheral surface of the outer member, the fixation surface having an axial dimension larger than a thickness of the plate portion, and
wherein an open space is formed between the lid member and the outer member so as to be opened toward an inner periphery of the outer member, the open space being filled with an adhesive.

2. A fluid dynamic bearing device according to claim 1, wherein the shaft member comprises a flange portion, and a thrust bearing gap is formed between one end surface of the flange portion and one end surface of the outer member, and wherein an axial end of the fixation surface of the lid member is positioned beyond the thrust bearing gap.

3. A fluid dynamic bearing device, comprising:
an outer member opened at its both ends;
a shaft member inserted inside the outer member;
a lid member for closing an opening portion at one of the both ends of the outer member; and
a radial bearing gap facing with an outer peripheral surface of the shaft member and having one end communicating with a space closed by means of the lid member, the radial bearing gap including an oil film with which the shaft member is rotatably supported,
wherein the lid member comprises a plate portion and a fixation surface to be fixed to an outer peripheral surface of the outer member, the fixation surface having an axial dimension larger than a thickness of the plate portion, and
wherein an open space is formed between the lid member and the outer member so as to be opened toward an outer periphery of the outer member, the open space being used as an adhesive pool when another member is fixed by bonding to the outer peripheral surface of the outer member.

4. A fluid dynamic bearing device according to claim 3, wherein the shaft member comprises a flange portion, and a thrust bearing gap is formed between one end surface of the flange portion and one end surface of the outer member, and wherein an axial end of the fixation surface of the lid member is positioned beyond the thrust bearing gap.

5. A fluid dynamic bearing device, comprising:
an outer member opened at its both ends;
a shaft member inserted inside the outer member, the shaft member comprising a shaft portion and a flange portion;
a lid member for closing an opening portion at one of the both ends of the outer member; and
a radial bearing gap facing with an outer peripheral surface of the shaft member and having one end communicating with a space closed by means of the lid member, the radial bearing gap including an oil film with which the shaft member is rotatably supported,
wherein the lid member comprises a plate portion and a fixation surface to be fixed to an inner peripheral surface or an outer peripheral surface of the outer member, the fixation surface having an axial dimension larger than a thickness of the plate portion,
wherein the lid member further comprises a fixed portion extending in an axial direction from an outer diameter end of the plate portion, the fixation surface being provided to an outer peripheral surface or an inner peripheral surface of the fixed portion,
wherein a first thrust bearing gap is formed between one end surface of the flange portion and one end surface of the outer member,
wherein a second thrust bearing gap is formed between another end surface of the flange portion and one end surface of the plate portion of the lid member, and
wherein the lid member and the outer member are fixed without contacting each other in the axial direction.

6. A fluid dynamic bearing device according to claim 5, wherein an axial end of the fixed portion of the lid member is positioned beyond the first thrust bearing gap.

* * * * *